US010232879B2

(12) United States Patent
Taki et al.

(10) Patent No.: US 10,232,879 B2
(45) Date of Patent: Mar. 19, 2019

(54) COMMUNICATION SYSTEM

(71) Applicant: DENSO CORPORATION, Kariya, Aichi-pref. (JP)

(72) Inventors: Masaya Taki, Kariya (JP); Toshimitsu Sakai, Kariya (JP); Kouichi Nakamura, Kariya (JP); Shuji Kuramitsu, Kariya (JP); Takaharu Kozawa, Kariya (JP); Katsuhiko Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 225 days.

(21) Appl. No.: 15/178,425

(22) Filed: Jun. 9, 2016

(65) Prior Publication Data
US 2016/0362137 A1    Dec. 15, 2016

(30) Foreign Application Priority Data

Jun. 12, 2015  (JP) .................................. 2015-119421

(51) Int. Cl.
*B62D 15/02*   (2006.01)
*B62D 6/00*    (2006.01)
(Continued)

(52) U.S. Cl.
CPC ......... *B62D 15/025* (2013.01); *B62D 5/0457* (2013.01); *B62D 5/0481* (2013.01);
(Continued)

(58) Field of Classification Search
USPC ......................................................... 702/176
See application file for complete search history.

(56) References Cited

U.S. PATENT DOCUMENTS 5,117,504 A * 5/1992 Dennerlein ........... H04W 88/02
327/262
5,609,546 A * 3/1997 Torii .................... B60K 31/047
180/179
(Continued)

OTHER PUBLICATIONS

U.S. Appl. No. 15/178,414, filed Dec. 15, 2016, Taki, et al.
(Continued)

*Primary Examiner* — Paul D Lee
(74) *Attorney, Agent, or Firm* — Knobbe, Martens, Olson & Bear, LLP

(57) ABSTRACT

A communication system includes a sensor apparatus, which includes sensing elements and a transmission circuit, and a microcomputer, which includes a reception circuit, a difference calculator, and a differential calculator. The transmission circuit shifts a transmission time point of one of sensor signals including sensor value detected by one of the sensing elements by a predetermined period with respect to a transmission time point of another one of sensor signals including sensor value detected by another one of the sensing elements. The predetermined period is set shorter than a transmission cycle of the transmission circuit. The difference calculator calculates a difference value so that an offset error among the sensing elements is compensated or a fluctuation caused by a variation in slopes of output characteristics of the sensing elements is reduced.

14 Claims, 15 Drawing Sheets

(51) Int. Cl.
*H04L 7/00* (2006.01)
*B62D 5/04* (2006.01)
*H04L 29/08* (2006.01)

(52) U.S. Cl.
CPC ........... *B62D 5/0484* (2013.01); *B62D 6/002* (2013.01); *H04L 7/0041* (2013.01); *H04L 67/12* (2013.01)

(56) References Cited

U.S. PATENT DOCUMENTS

| | | | |
|---|---|---|---|
| 7,028,467 B2 * | 4/2006 | Kuboshima | F01N 9/002 60/274 |
| 2013/0343472 A1 | 12/2013 | Scherr | |
| 2015/0066301 A1 | 3/2015 | Kozawa | |

OTHER PUBLICATIONS

SAE International, Surface Vehicle Information Report—SENT—Single Edge Nibble Transmission for Automotive Applications, SAE J2716, Jan. 2010, pp. 1-pp. 56.
U.S. Appl. No. 15/086,643, filed Mar. 31, 2016, Kozawa, et al.
U.S. Appl. No. 15/173,117, filed Jun. 3, 2016, Suzuki, et al.

\* cited by examiner

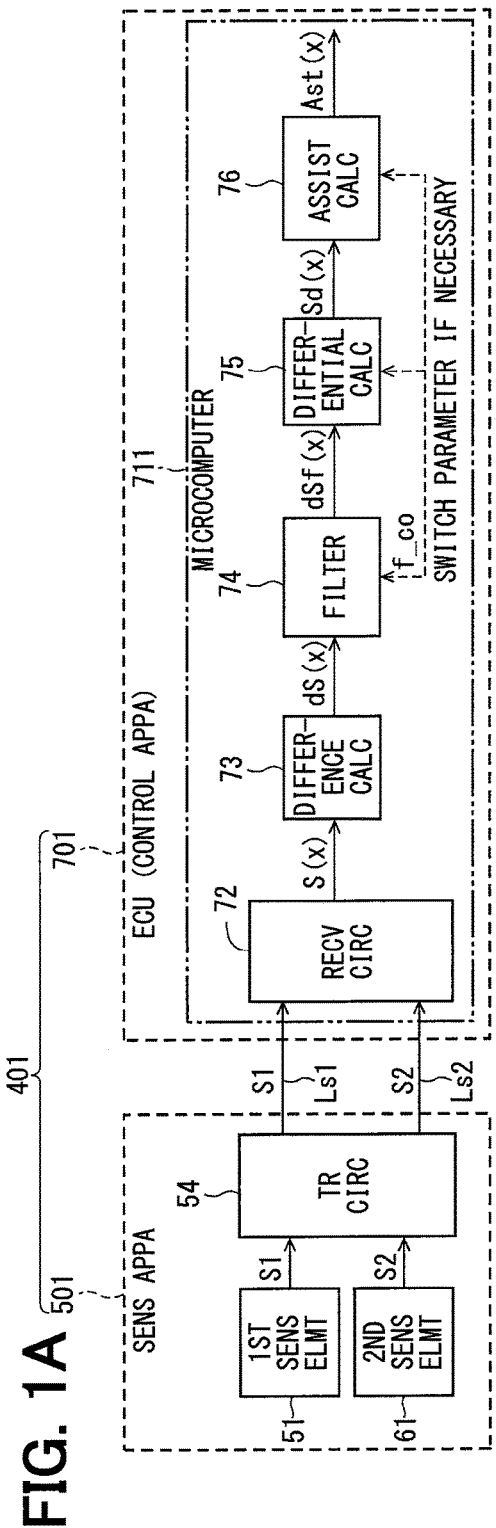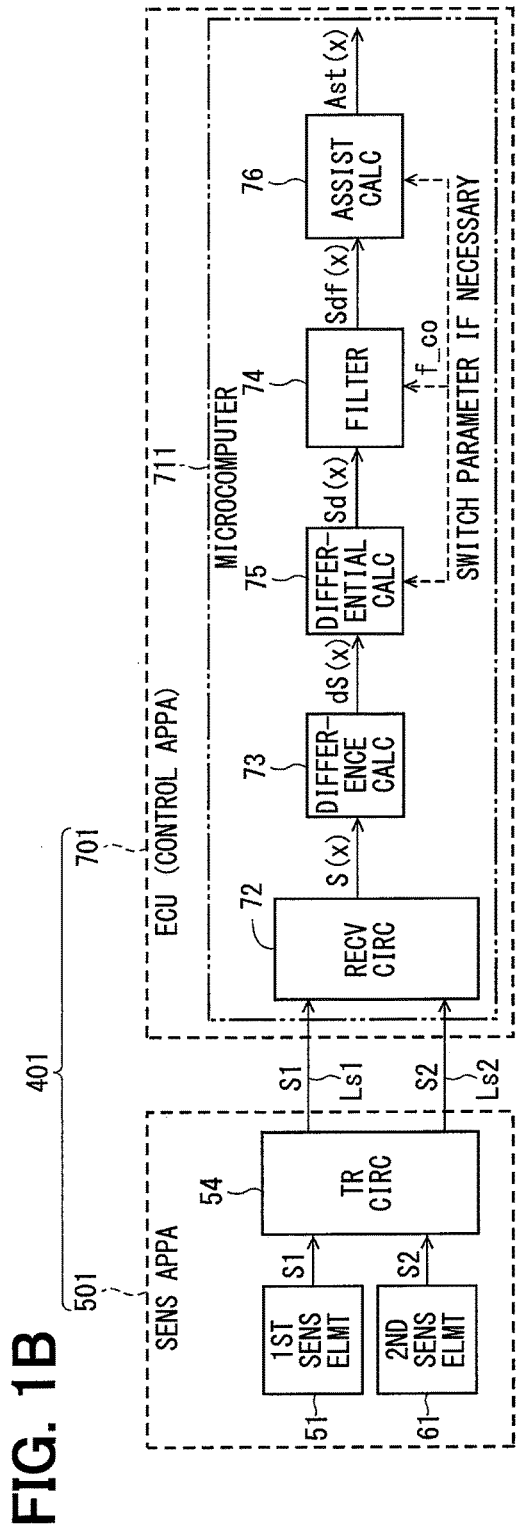

FIG. 9
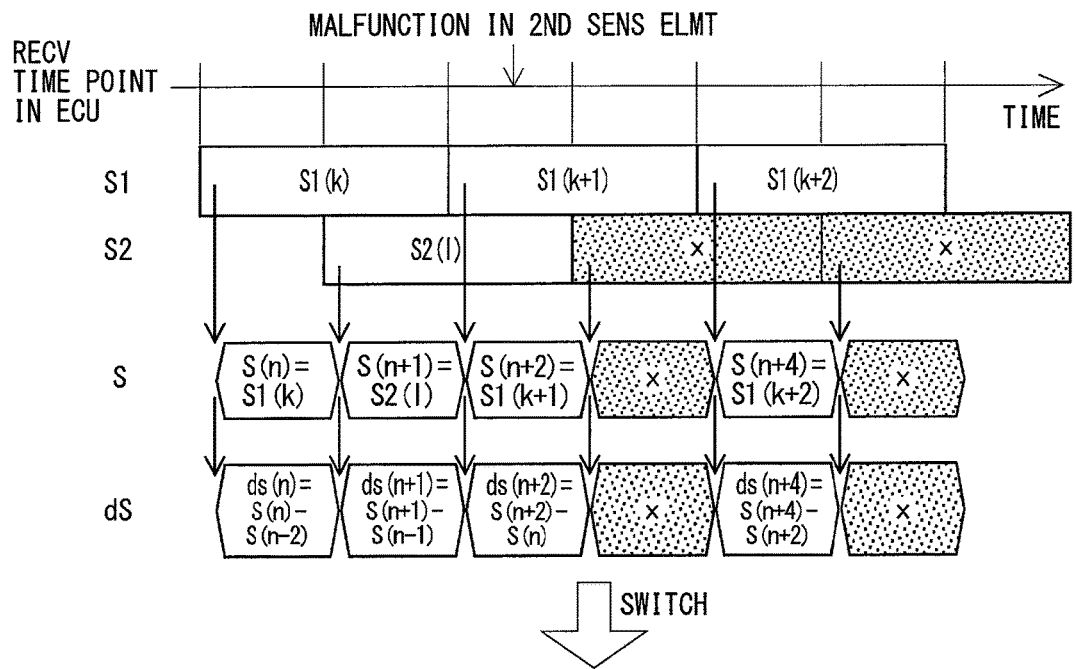
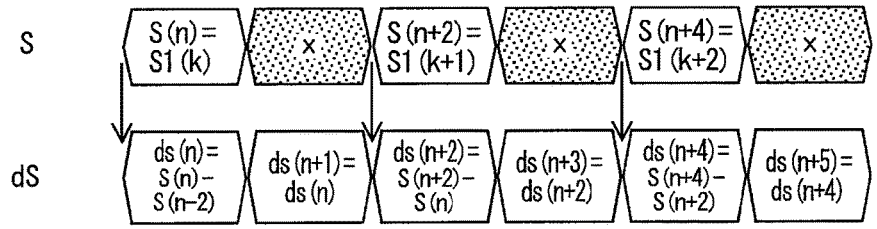
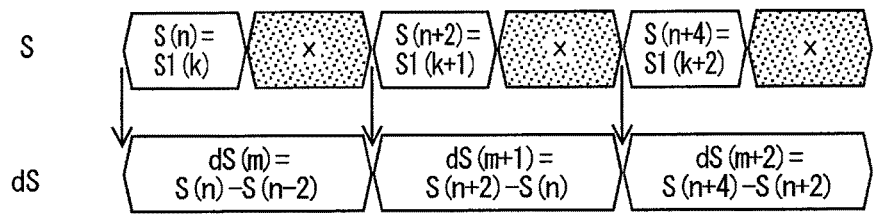

COMMUNICATION SYSTEM

CROSS REFERENCE TO RELATED APPLICATION

This application is based on Japanese Patent Application No. 2015-119421 filed on Jun. 12, 2015, the disclosure of which is incorporated herein by reference.

TECHNICAL FIELD

The present disclosure relates to a communication system in which a sensor transmits a detection signal to a control apparatus.

BACKGROUND

In a conventional communication system in which a sensor transmits a detection signal to a control apparatus, the sensor and the control apparatus are configured to operate under the common time information. For example, as disclosed in US 2013/0343472 A1, the control apparatus generates a trigger signal as a request signal, and transmits the trigger signal to the sensor. In response to the request signal, the sensor transmits the sensor signal as a response signal to the control apparatus.

In US 2013/0343472 A1, it is considered that a trigger signal transmitted through a single signal line is branched on receiving end and two sensors simultaneously transmit respective sensor signals in response to the received trigger signals. In this configuration, even though two sensor values are acquired from respective two sensors, a data update cycle cannot be shortened compared with a case where the sensor value is acquired from a single sensor.

The data update cycle can be shortened by shifting acquisition time points of the sensor values from one another in a control apparatus. The shifting of the acquisition time points of the sensor values may be achieved by shifting transmission time points of the sensor signals including respective sensor values by a period shorter than the transmission cycle. Herein, the multiple sensor values are detected by respective sensing elements, and indicate detection result of a certain physical quantity. That is, the physical quantity to be detected by the multiple sensing elements is the same physical quantity of the same detection target.

In the above-described communication system, suppose that a microcomputer calculates a difference value indicating a difference of the multiple sensor values that are received, and the microcomputer further calculates a differential value by dividing the difference value by a time difference. In this case, when the output characteristic of each sensing element has an offset error or a variation in slope from one another, the difference value of the multiple sensor values cannot be calculated correctly.

SUMMARY

In view of the foregoing difficulties, it is an object of the present disclosure to provide a communication system in which a microcomputer can correctly calculate a difference value of multiple sensor values, which are detected by multiple sensing elements and received by the microcomputer at different time points, even though the multiple sensing elements have different output characteristics. Herein, the multiple sensor values indicate detection results of the same physical quantity.

According to an aspect of the present disclosure, a communication system includes a sensor apparatus and a microcomputer. The sensor apparatus includes multiple sensing elements and a transmission circuit. Each of the multiple sensing elements detects a sensor value indicating a common physical quantity of a common detection target. The transmission circuit transmits, at a transmission cycle, multiple sensor signals each of which including information indicating the sensor value detected by each of the multiple sensing elements. Herein, the multiple sensor signals are transmitted as digital signals and the transmission cycle is a constant cycle. The microcomputer includes a reception circuit, a difference calculator, and a differential calculator. The reception circuit receives the multiple sensor signals and acquires the sensor values. The difference calculator calculates a difference value, which is a value indicating a difference among the sensor values or among processed sensor values. The processed sensor values are calculated based on the sensor values. The differential calculator calculates a differential value by dividing the difference value by a time difference. The transmission circuit shifts a transmission time point of one of the multiple sensor signals including the sensor value detected by one of the multiple sensing elements by a predetermined period with respect to a transmission time point of another one of the multiple sensor signals including the sensor value detected by another one of the multiple sensing elements. The predetermined period is set shorter than the transmission cycle of the transmission circuit. The reception circuit updates, at different time points, the sensor values acquired from the multiple sensor signals transmitted from the transmission circuit at the transmission time points different from one another. The difference calculator calculates the difference value so that an offset error among the multiple sensing elements is compensated or a fluctuation caused by a variation in slopes of output characteristics of the multiple sensing elements is reduced.

In the above communication system, the difference calculator properly selects the sensor values received by the microcomputer and calculates the difference value. Then, the differential calculator calculates the differential value based on the difference value. Thus, the differential value can be correctly calculated even in a case where the multiple sensing elements have different output characteristics.

BRIEF DESCRIPTION OF THE DRAWINGS

The above and other objects, features and advantages of the present disclosure will become more apparent from the following detailed description made with reference to the accompanying drawings. In the drawings:

FIG. 1A is a block diagram showing a configuration of a communication system in which a filter is disposed posterior to a difference calculator according to first to fifth embodiments of the present disclosure;

FIG. 1B is a block diagram showing a configuration of a communication system in which a filter is disposed posterior to a differential calculator according to first to fifth embodiments of the present disclosure;

FIG. 9 is a time chart showing processed sensor values and difference value calculation when a malfunction occurs to one of the sensing elements according to the fourth embodiment of the present disclosure;

DETAILED DESCRIPTION

The following will describe a communication system according to embodiments of the present disclosure with reference to the accompanying drawings. In the present embodiment, the same reference number or symbol is added to the same or equivalent parts, and a description of the similar part will be omitted. In the present disclosure, the term "present embodiment" is used to describe each of the first to sixth embodiments.

First Embodiment

The following will describe a communication system according to the first embodiment of the present disclosure with reference to FIG. 1A to FIG. 5. The communication system according to the present embodiment is applied to, for example, an electric power steering apparatus equipped to a vehicle.

Figure 2:
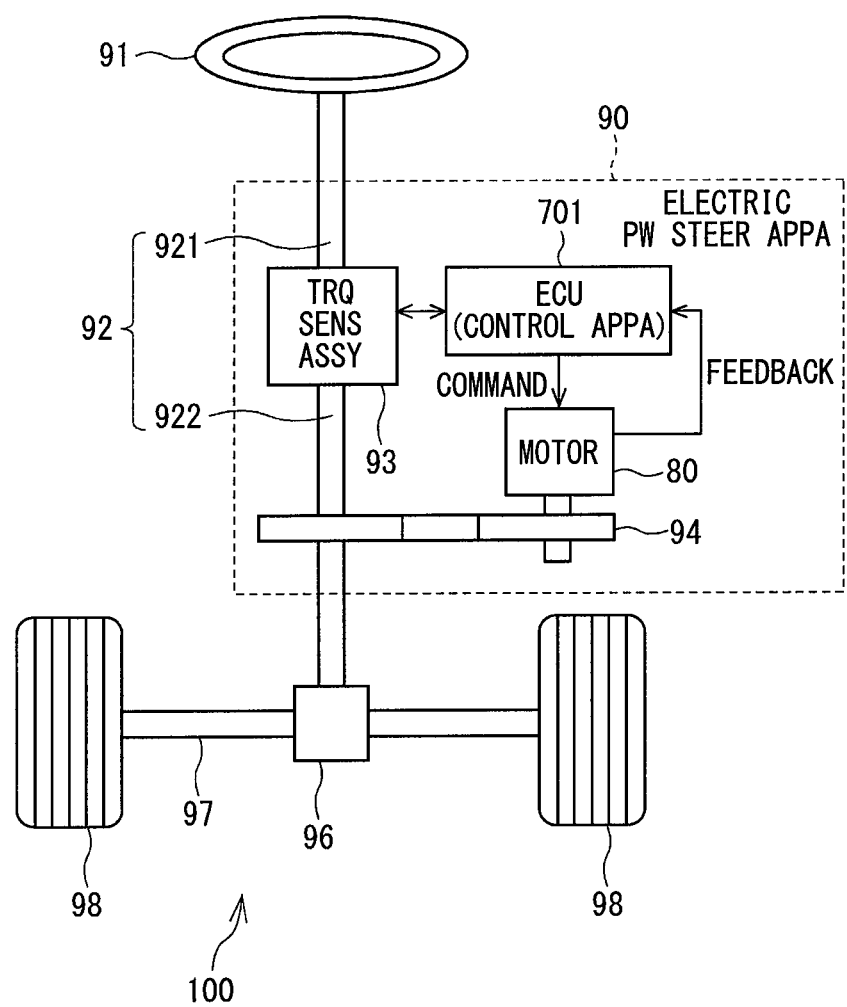
FIG. 2 is diagram showing a configuration of an electric power steering apparatus to which the communication system according to the present disclosure is applied.

FIG. 2 shows a configuration of a steering system 100 including the electric power steering apparatus 90. The electric power steering apparatus 90 shown in FIG. 2 is a column assisted electric power steering apparatus. Alternatively, the communication system may also be applied to a rack assisted electric power steering apparatus.

The steering system 100 includes a steering wheel 91, a steering shaft 92, a pinion gear 96, a rack shaft 97, wheels 98, and the electric power steering apparatus 90.

The steering shaft 92 is connected to the steering wheel 91. The pinion gear 96 disposed at an end of the steering shaft 92 is engaged with the rack shaft 97. A pair of wheels 98 is disposed at both ends of the rack shaft 97 through, for example, tie rods. When a driver rotates the steering wheel 91, the steering shaft 92 connected to the steering wheel 91 starts to rotate. The rotation motion of the steering shaft 92 is converted to a linear motion of the rack shaft 97 by the pinion gear 96, and a pair of the wheels is steered by an angle corresponding to a displacement amount of the rack shaft 97.

The electric power steering apparatus (ELECTRIC PW STEER APPA) 90 includes a torque sensor assembly (TRQ SENS ASSY) 93, an electronic control unit (ECU) 701, a motor 80, and a speed reduction gear 94. The ECU 701 functions as a control apparatus (CONTROL APPA).

The torque sensor assembly 93 is disposed at a portion between two ends of the steering shaft, and detects a steering torque. Specifically, the torque sensor assembly 93 detects the steering torque based on a twist angle of an input axis 921 disposed on the steering wheel side and a twist angle of an output axis 922 disposed on the pinion gear side. The ECU 701 calculates a torque command indicating an assist torque to be outputted by the motor 80 based on the steering torque acquired from the torque sensor assembly 93. Then, the ECU 701 controls a power supply to the motor 80 so that the motor 80 outputs the torque required by the torque command. The assist torque generated by the motor 80 is transferred to the steering shaft 92 through the speed reduction gear 94.

For example, the ECU 71 controls a power supply to the motor 80 by performing a feedback control to a current supplied to the motor 80 and a torque outputted from the motor 80. The control process performed by the ECU 701 may be achieved by a software process or a hardware process. When the control process is achieved by the software process, a central processing unit (CPU) of the microcomputer 711 executes a preliminarily stored program to perform the control process. When the control process is achieved by the hardware process, a special purpose electric circuit may be provided to perform the control process. The ECU 701 may be integrated with the motor 80 as one body.

The following will describe a configuration of the communication system according to the first to fifth embodiments of the present disclosure with reference to FIG. 1A and FIG. 1B. In two configurations shown in FIG. 1A and FIG. 1B, only a position of a filter 74 is different, and other configuration is similar to one another. Regarding the position of the filter 74, each of the first to fifth embodiments may adopt the configuration shown in FIG. 1A or the configuration shown in FIG. 1B.

The communication system 401 includes a sensor apparatus (SENS APPA) 501 and a microcomputer 711. The sensor apparatus 501 detects a twist angle in the torque sensor assembly 93 and transmits a sensor signal. The microcomputer 711 receives the sensor signal from the sensor apparatus 501. The microcomputer 711 is included in the ECU 701 and performs a main calculation operation. In the description of the present embodiment, detailed description of a specific configuration of the ECU 701 except the microcomputer 711 will be omitted.

The sensor apparatus 501 is communicably connected with the microcomputer 711 of the ECU 701 through signal lines Ls1 and Ls2. Herein, signal lines Ls1 and Ls2 are described as different signal lines in order to clarify two signal lines Ls1 and Ls2 corresponding to respective sensor signals S1 and S2, which will be described later. In actual use, the two signal lines Ls1 and Ls2 may be achieved by one physical signal wire without being divided into two separate wires.

The sensor apparatus 501 includes multiple sensing elements and a transmission circuit 54 (TR CIRC). In the present embodiment, two sensing elements 51, 61 will be described as an example. Each of the two sensing elements 51, 61 detects, from the same detection target, a sensor value associated with the same physical quantity of the same detection. The transmission circuit 54 transmits, as digital signals, sensor signals each of which including information related to the corresponding sensor value. The transmission cycle of the sensor signals from one sensing element 51 is constant, and the transmission cycle of the sensor signals from another sensing element 61 is constant.

Hereinafter, the sensing element 51 is referred to as a first sensing element (1ST SENS ELMT) 51, and the sensing element 61 is referred to as a second sensing element (2ND SENS ELMT) 61. Further, the sensor value S1 detected by the first sensing element 51 is referred to as a first sensor value S1 and the sensor value S2 detected by the second sensing element 61 is referred to as a second sensor value S2.

Hereinafter, the terms "sensor value" and the "sensor signal" are properly used according to the situations. In the drawings, both the sensor value and the sensor signal are indicated by the symbols "S1" and "S2".

In an actual use, the sensor apparatus 501 needs a power source to supply power to the sensing elements 51, 61 and the transmission circuit 54, and also needs a reference voltage generation unit. For simplification, the power source and the reference voltage generation unit are not shown in the drawing and description is also omitted. For example, the sensor apparatus 501 may be supplied with power by a power supplying circuit (not shown) included in the ECU 701. In this case, the sensor apparatus 501 is connected with the ECU 701 through a power supply line and a reference voltage line, in addition to the signal lines Ls1 and Ls2.

For example, when hall elements each of which detects a magnetic field is used as the sensing elements 51 and 61, a hall IC formed as a package including the hall elements corresponds to the sensor apparatus 501. In addition to the sensor apparatus 501, the torque sensor assembly 93 further includes a torsion bar, a multipolar magnet, a magnetic yoke, a magnetism collecting ring and the like. Since a configuration of the torque sensor assembly 93 is well known, a detailed drawing of the torque sensor assembly 93 is not shown.

When each sensing element 51, 61 is provided by the hall element, each sensing element 51, 61 detects a magnetism displacement of the magnetism collecting ring corresponding to the twist displacement of the torsion bar, converts the detected magnetism displacement to a voltage signal, and outputs the converted voltage signal. In this example, the magnetism collecting ring corresponds to a detection target.

The twist displacement or a steering torque correlated to the twist displacement corresponds to detection information about the detection target.

Specifically, the sensing elements 51, 61 are disposed in redundant manner in order to secure the detection operation when one of the sensing elements 51, 61 has an abnormality or a malfunction. Herein, the sensing elements 51, 52 have substantially same specification and performance, and each sensing element detects a steering torque of the same magnetism collecting ring of the same torque sensor assembly 93. That is, each sensing element detects a common physical quantity of a common detection target.

Each transmission circuit 54 shown in FIG. 1A and FIG. 1B has a sampling and holding function, analog to digital converting function, a memory function, and a timer function. The transmission circuit 54 samples and holds an analog voltage signal outputted from each sensing element 51, 61 for a predetermined number of cycles, and performs an analog to digital conversion to the analog signal. The transmission circuit 54 transmits the sensor signal, which is obtained from one sensing element 51, to the microcomputer 711 as a digital signal at a constant transmission cycle. Similarly, the transmission circuit 54 transmits the sensor signal, which is obtained from another sensing element 61, to the microcomputer 711 as a digital signal at a constant transmission cycle. The transmission cycles in the multiple sensing elements may be set identical to one another, or may be set different from one another. In the present embodiment, the transmission cycles are set identical to one another as an example.

In the present embodiment, the transmission circuit 54 shifts a transmission time point of the second sensor signal S2 including the sensor value detected by the second sensing element 61 by a predetermined period with respect to a transmission time point of the first sensor signal S1 including the sensor value detected by the first sensing element 51. Herein, the predetermined shift period is set shorter than a single transmission cycle. Specifically, in the present embodiment, the shift period is set equal to half of the transmission cycle. That is, the sensor signals S1 and S2 are alternatively transmitted at each time point equal to multiple of the half of the transmission cycle.

The microcomputer 711 may transmit a synchronization signal to the sensor apparatus 501 in order to synchronize the transmission cycle of the transmission circuit 54 with the calculation cycle of the microcomputer 711.

In the present embodiment, the sensor signal adopts a nibble signal defined under SAE-J2716 which is a standard established by Society of Automotive Engineers International. The nibble signal is a signal defined under a Single Edge Nibble Transmission (SENT) protocol.

In SENT protocol, a bidirectional communication is enabled using a nibble signal having four bit width as disclosed in JP 2015-46770. As an example of the sensor signal defined under the SENT protocol, data outputted from the main sensor and data outputted from the subsidiary sensor may be transmitted in a single signal frame as shown in FIG. 3.

Figure 3:
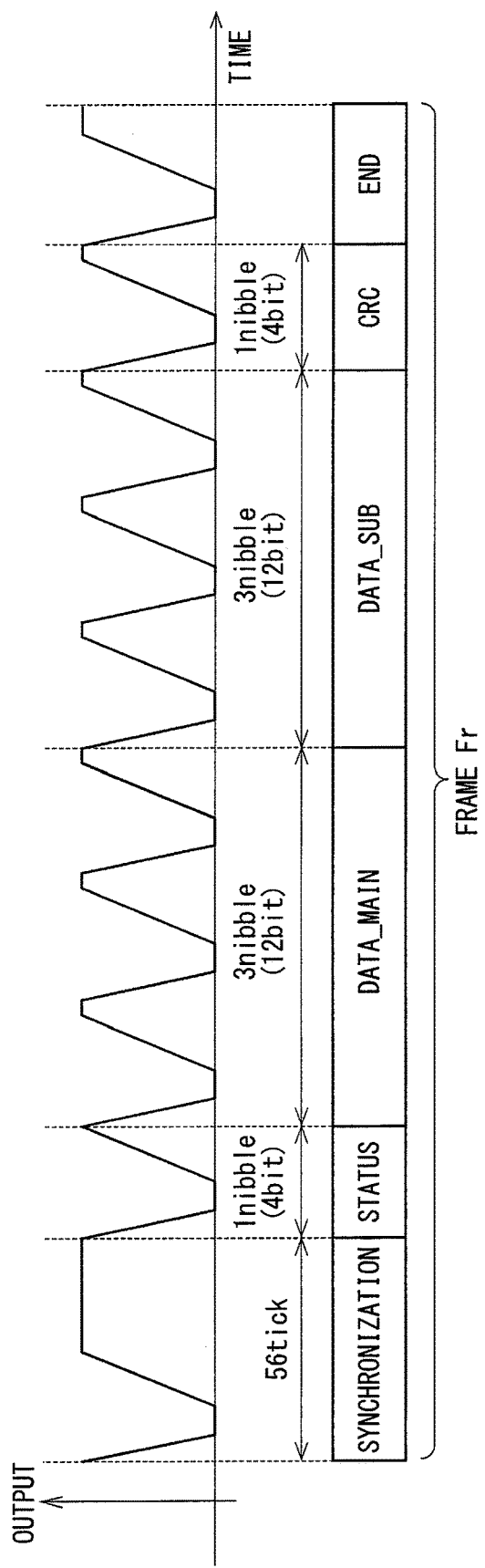
FIG. 3 is a diagram showing an example of a sensor signal utilized in a single edge nibble transmission (SENT) communication.

The sensor signal shown in FIG. 3 includes, in a frame, a synchronization field, a status field, main data field, subsidiary data field, cyclic redundancy check (CRC) field, and end field. The data stored in the multiple fields of the sensor signal are outputted in the described order.

For example, a length of the synchronization signal is 56 ticks. Herein, one tick is defined as 1.5 microsecond. For example, a size of the status field may be one nibble (4 bits), a size of the main data field may be three nibbles (12 bits), a size of the subsidiary data field may be three nibbles (12 bits), and a size of the CRC field may be one nibble (4 bits). When the size of the data signal is three nibbles, twelfth power of two ($2^{12}$=4096) kinds of data values can be transmitted using the three nibble signal.

The microcomputer 711 of the ECU 701 includes a reception circuit (RECV CIRC) 72, a difference calculator (DIFFERENCE CALC) 73, a filter 74, a differential calculator (DIFFERENTIAL CALC) 75, and an assist amount calculator (ASSIST CALC) 76.

The reception circuit 72 receives the sensor signals transmitted from the transmission circuit 54 through respective signal lines Ls1 and Ls2, and acquires the sensor values S1 and S2. The reception circuit 72 updates the sensor values S1, S2 obtained based on the sensor signals at different time points, and holds the updated values. Herein, transmission time points of the sensor signals S1, S2 transmitted from the transmission circuit 54 are shifted from one another by the predetermined period. The sensor values S1, S2 updated by the reception circuit 72 are also referred to as reception value S1 and reception value S2 in FIG. 5 and the following drawings and related description.

As described above, the reception circuit 72 alternatively receives the sensor values S1 and S2 at different time points. That is, the reception circuit 72 receives the sensor values by twice in one transmission cycle. Thus, a data update cycle in the microcomputer 711 can be doubled, and an ostensible sampling cycle can be shortened by half. As a result, when the communication of the sensor signal needs a relatively long period of time, the calculation speed of the microcomputer 711 can be increased with this configuration.

The difference calculator 73 calculates a difference value dS of multiple sensor values S, or calculates a difference value dS of multiple processed sensor values. Herein, the multiple processed sensor values are values processed based on the sensor values according to a predetermined rule.

The differential calculator 75 calculates a differential value Sd by dividing the difference value dS by a time difference.

The filter 74 is provided by a low pass filter, and performs a filtering process to the difference value dS as shown in FIG. 1A or to the differential value Sd as shown in FIG. 1B. The filter 74 may be disposed posterior to the difference calculator 73 as shown in FIG. 1A, or may be disposed posterior to the differential calculator 75 as shown in FIG. 1B. The position of the filter 74 is determined according to a calculation mode switch of the difference value or the differential value which will be described later. The filter 74 has a variable cutoff frequency f_co.

Each of the filter 74, the differential calculator 75, and the assist amount calculator 76 switches a calculation parameter, such as the cutoff frequency of the filter, corresponding to the calculation carried out based on the sensor value S1, or corresponding to the calculation carried out based one the sensor value S2 according to whether an abnormality occurs in the first or second sensing element 51, 61. That is, when an abnormality occurs to the first sensing element 51, the assist amount calculator 76 switches to the calculation parameter corresponding to the calculation carried out based on the sensor value S2 of the second sensing element. Similarly, when an abnormality occurs to the second sensing element 61, the assist amount calculator 76 switches to the calculation parameter corresponding to the calculation carried out based on the sensor value S1 of the first sensing element.

In the following description, calculation values corresponding to different calculation time points in the microcomputer are represented as sensor value S(x), difference value dS(x), and differential value Sd(x) associated with the parameter x. Similarly, the last time sensor value is represented as S(x−1), and the next time sensor value is represented as S(x+1). Further, a value obtained by performing a filtering process to the difference value dS(x) is represented as dSf(x), and a value obtained by performing a filtering process to the differential value Sd(x) is represented as Sdf(x).

In the present embodiment, the communication system 401 is applied to the electric power steering apparatus 90, and the sensor values S1, S2 indicate the steering torques. Positivity or negativity of the sensor value is defined corresponding to a rotation direction of the steering wheel 91. The differential value Sd corresponds to a changing rate of the steering torque with respect to time. When a driver operates the steering wheel 91 at a sharp angle within a short time, an absolute value of the differential value Sd may be increased. When the driver slowly operates the steering wheel 91, the absolute value of the differential value Sd may be decreased.

The microcomputer 711 of the ECU 701 controls the assist torque required to be outputted by the motor 80 corresponding to a steering characteristic of the driver. Thus, the assist amount calculator 76 calculates an assist amount Ast(x) based on the differential value Sd(x) calculated by the differential calculator 75.

The microcomputer 711 controls, based on the assist amount (corresponding to torque command), a power to be applied to a coil of the motor 80. This power supply to the motor 80 is carried out by a well-known method, for example, controlling switching operations of an inverter in current feedback manner. As a result, the motor 80 can output a required torque to assist the steering operation of the driver.

The following will describe how to obtain the processed sensor value S and the difference value dS in the communication system 401 having the above-described configuration. First, a comparison example will be described with reference to FIG. 16. The expressions used in FIG. 16 are also employed in description of the following embodiments according to the present disclosure.

Figure 16:
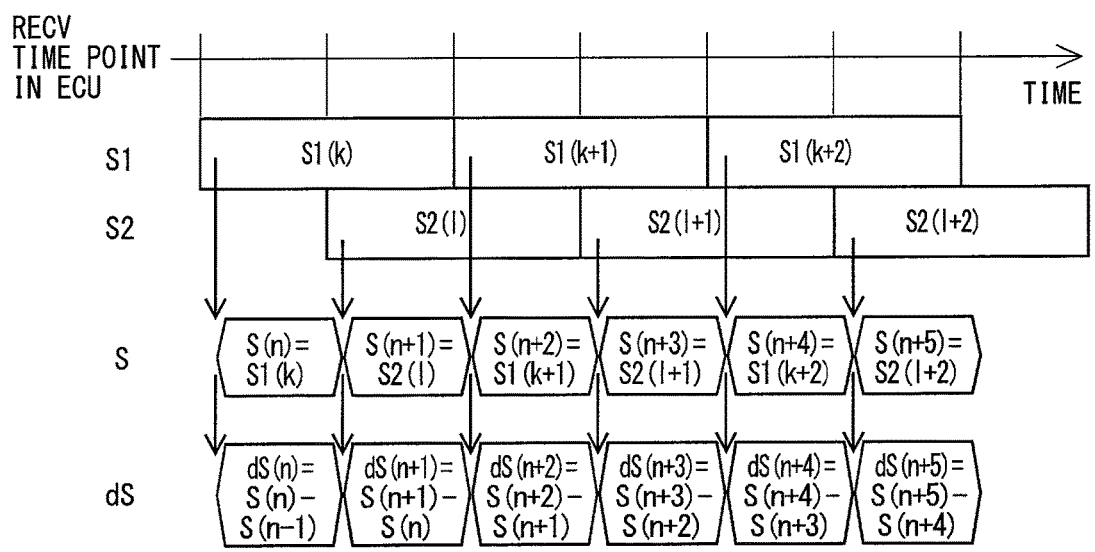
FIG. 16 is a time chart showing processed sensor values and difference value calculation according to a related art.

FIG. 16 shows reception value S1, reception value S2, processed sensor value S, and difference value dS in up to down direction. Hereinafter, the difference value dS is also referred to as sensor value difference dS.

The ECU 701 receives reception values S1 in time order. In FIG. 16, the ECU 701 receives three reception values S1(k), S1(k+1), and S1(k+2) in time order as an example. Further, the ECU 701 receives reception values S2 in time order. In FIG. 16, the ECU 701 receives three reception values S2(l), S2(l+1), S2(l+2) in time order as an example. Each reception value S2 is received at a time point later than a reception time point of the corresponding reception value S1 by half of the transmission cycle. For clarification purpose, the parameter indicating counts of the reception value S2 is small alphabet letter "l", but not the number "1".

In the above comparison example, the processed sensor value S is calculated at a cycle equal to half of the transmission cycle. In this comparison example, the sensor values S1 from the first sensing element and the sensor values S2 from the second sensing element are alternatively assigned as the processed sensor value S as S(n)=S1(k), S(n+1)=S2(l), S(n+2)=S1(k+1) and so on.

The sensor value difference dS is calculated by subtracting the last time processed sensor value S(n−1) from the present processed sensor value S(n). As described above, in the example shown in FIG. 16, the sensor value difference dS is simply obtained by subtracting the last time sensor value from the present sensor value.

In the comparison example, when the sensor values S1 and sensor values S2 detected by the respective sensing elements 51, 61 correctly indicate true values of the physical quantity of the detection target, the sensor value difference dS obtained by the above calculation method is correct and causes no adverse effect to the differential calculation in the following stage.

In actual use, the output characteristics of the multiple sensing elements 51, 61 have offset errors and variations in slopes. Thus, the calculation method according to the comparison example may fail to correctly calculate the sensor value difference dS. As a result, the differential value Sd may not be correctly calculated.

Figure 4A:
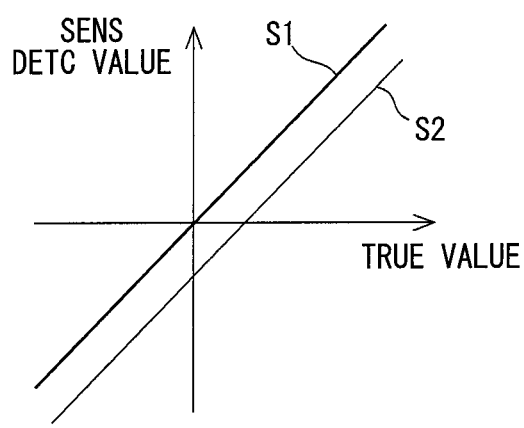
FIG. 4A is a diagram showing an example where an offset error exists in a sensor value of a sensing element.
Figure 4B:
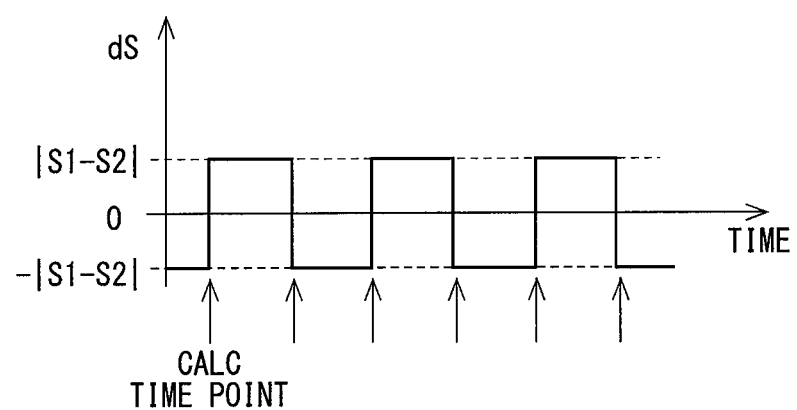
FIG. 4B is a diagram showing a calculation of a difference value of two sensor values when offset error exists.

The following will describe a calculation of the sensor value difference and the differential value when the sensor value has an offset error with reference to FIG. 4A and FIG. 4B. As shown in FIG. 4A, in a relationship between the true value and the sensor detection value (SENS DETC VALUE), suppose that the sensor value S2 has a negative offset error.

In this case, when the sensor value difference dS is simply calculated by subtracting the last time processed sensor value S(x−1) from the present processed sensor value S(x), a non-zero value is always calculated as shown in FIG. 4B even when the true value of the detection signal maintains the same without change. That is, in a calculation of subtracting the sensor value S2 from the sensor value S1, a positive difference value (|S1−S2|) is calculated. In a calculation subtracting the sensor value S1 from the sensor value S2, a negative difference value (−|S1−S2|) is calculated. The difference value calculated at the present calculation time point is maintained until the next calculation time point.

As described above, in the difference calculation method according to the comparison example shown in FIG. 16, when an offset error exists in the sensor values of the multiple sensing elements 51, 61, the differential value Sd cannot be correctly calculated. This may adversely affect a control performance based on the differential value Sd. When this calculation method is applied to the electric power steering apparatus, the assist torque has a pulsing motion, and this pulsing motion of the assist torque may adversely affect a steering experience of the driver.

Figure 5:
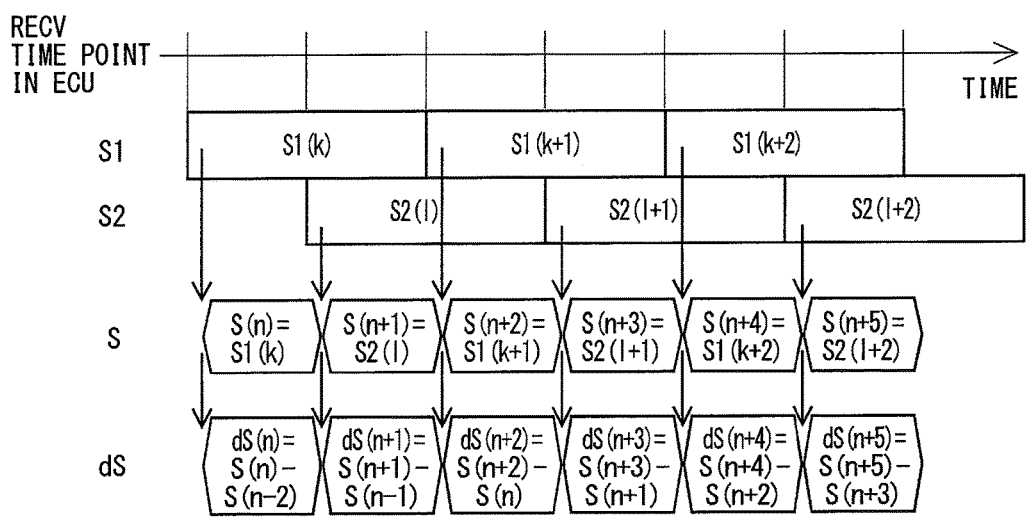
FIG. 5 is a time chart showing processed sensor values and difference value calculation according to the first embodiment of the present disclosure.

The following will describe a calculation of the processed sensor value S and the sensor value difference dS according to the first embodiment of the present disclosure with reference to FIG. 5. The calculation according to the first embodiment aims to correctly calculate the differential value Sd even when an offset error exists in the sensor values of the multiple sensing elements.

In the first embodiment, a difference between two sensor values detected by the same sensing element is calculated as the sensor value difference dS. In the example shown in FIG. 5, the reception values S1 detected by the sensing element 51 and the reception values S2 detected by the sensing element 61 are alternatively assigned as the processed sensor value S. In this case, the sensor value difference dS is calculated by subtracting the second prior processed sensor value S(x−2) from the present processed sensor value S(x) based on the following formula (1.1). With this calculation method, the offset error existing in the sensor values of different sensing elements can be compensated. With this calculation method, the error component can be removed from the calculated difference value dS.

$$dS(x)=S(x)-S(x-2) \quad (1.1)$$

In the above calculation method, the present processed sensor value and the immediately second prior processed sensor value are used to calculate the sensor value difference dS. As another example, the sensor value difference dS may be calculated by subtracting any even number prior processed sensor value S(x−2i) from the present processed sensor value S(x). Herein, symbol i is an integer.

Suppose that the number of sensing elements is equal to R (integer). In this case, the sensor value difference dS may be calculated using the following formula (1.2) based on the sensor values from the multiple sensing elements.

$$dS(x)=S(x)-S(x-i\times R) \quad (1.2)$$

As described above, in the communication system 401 according to the first embodiment, multiple sensing elements 51, 61 detect respective sensor values related to the steering torque, and the microcomputer 711 acquires the detected sensor values at different time points. The difference calculator 73 of the microcomputer 711 properly selects processed sensor values S to calculate the difference value dS so that an offset error existing in the sensor values of the multiple sensing elements 51, 61 is compensated. With this configuration, the error component can be removed from the difference value dS. Then, the differential calculator 75 uses the difference value dS from which the error component has been removed to calculate the differential value Sd. Thus, the differential value Sd can be correctly calculated.

When this calculation method is applied to the electric power steering apparatus 90, the changing rate of the steering torque with respect to time can be correctly corrected. Accordingly, the assist torque required to be outputted from the motor 80 can be properly controlled. This may improve a steering experience of the driver.

Preferably, as described above, the difference calculator 73 calculates, regarding at least one of the multiple sensing elements 51, 61, the difference value based on the sensor values detected by the same sensing element at different time points.

The communication system according to the second to the fifth embodiments has a circuit configuration similar to the communication system 401 according to the first embodiment. In the second to fifth embodiments, the calculation method of the processed sensor value and the difference value is different from the first embodiment.

Second Embodiment

Figure 6A:
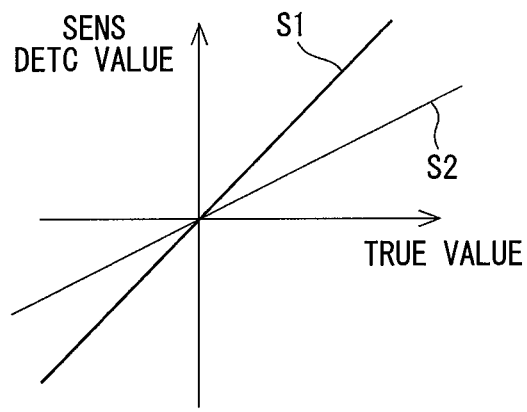
FIG. 6A is a diagram showing an example where slopes of output characteristics of sensor values outputted from respective sensing elements are different from one another.
Figure 6B:
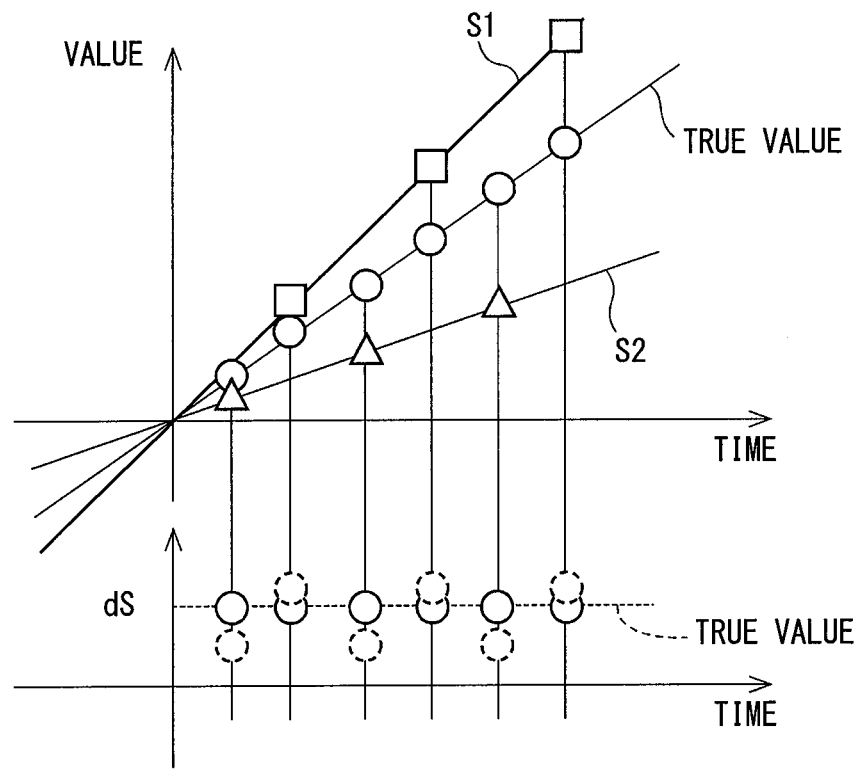
FIG. 6B is a diagram showing a calculation of a difference value of two sensor values when output characteristics of sensor values are different from one another.

The following will describe a calculation of the sensor value difference or the differential value when slopes of the output characteristics of the sensing elements are different from one another with reference to FIG. 6A and FIG. 6B. As shown in FIG. 6A, suppose that a slope of the sensor detection value (SENS DETC VALUE) indicated by the sensor value S1 with respect to the true value is different from a slope of the sensor detection value indicated by the sensor value S2 with respect to the true value. In this case, when the microcomputer alternatively receives the sensor values S1 and S2 and calculates the difference value, the difference calculation result fluctuates at each calculation time shown by dashed circles in FIG. 6B. When this calculation method is applied to the electric power steering apparatus, the assist torque has a pulsing motion, and this may adversely affect a steering experience of the driver.

Figure 7:
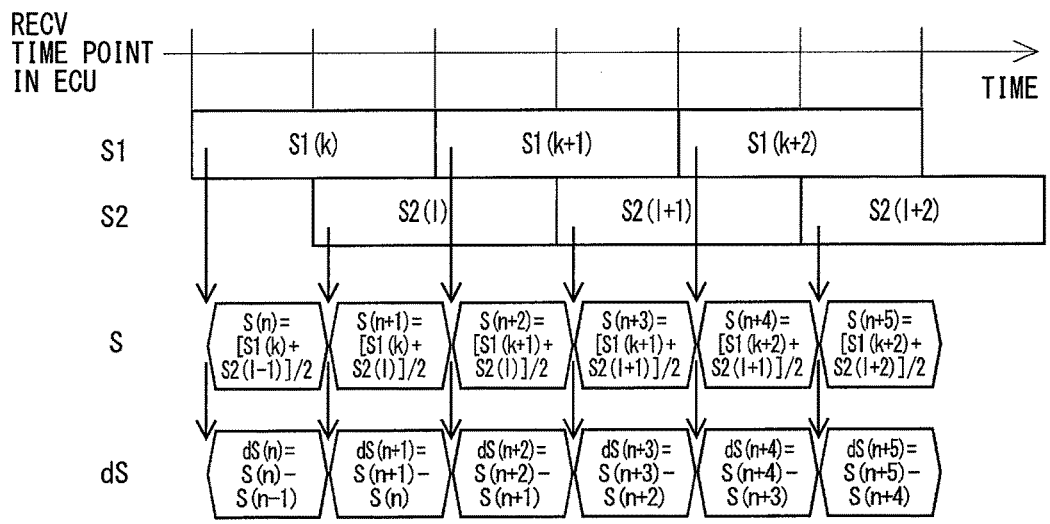
FIG. 7 is a time chart showing processed sensor values and difference value calculation according to the second embodiment of the present disclosure.

The following will describe a calculation of the processed sensor value S and the sensor value difference dS according to the second embodiment of the present disclosure with reference to FIG. 7. The calculation according to the second embodiment aims to correctly calculate the differential value Sd even when slopes of the output characteristics of the multiple sensing elements are different from one another.

In the second embodiment, an average of the reception value S1 and the corresponding reception value S2 is calculated as the processed sensor value S. That is, an average of the present sensor value and the last time sensor value is calculated as the processed sensor value S. Then, when calculating the sensor value difference dS, a difference between two adjacent average values is calculated as the difference value.

In an example shown in FIG. 7, the processed sensor value S is calculated by formula (2.1) and formula (2.2).

$$S(n-1) = [S1(k-1) + S2(l-1)]/2 \quad (2.1)$$

$$S(n) = [S1(k) + S2(l-1)]/2 \quad (2.2)$$

Then, the sensor value difference dS is calculated based on the processed sensor value S using the following formula (2.3).

$$dS(n) = S(n) - S(n-1) = \frac{S1(k) + S2(l-1)}{2} - \frac{S1(k-1) + S2(l-1)}{2} \quad (2.3)$$

The processed sensor values S1 and S2 are represented as a form of a successive processed sensor value S in time order as the following.

S1(k−1)→S(x−2)
S2(l−1) S(x−1)
S1(k)→S(x)

When dS(n) is replaced with dS(x), the above formula (2.3) can be rewritten as the following formula (2.4).

$$dS(x) = \frac{S(x) + S(x-1)}{2} - \frac{S(x-1) + S(x-2)}{2} \quad (2.4)$$

When the update cycle of the sensor value difference dS is longer than the calculation cycle of the processed sensor value S, integer j can be freely set within a range equal to or greater than 2. In this case, the following formula (2.5) can be used.

$$dS(n) = S(n) - S(n-j) \quad (2.5)$$

For example, when j=2, formula (2.5) can be represented as formula (2.6).

$$dS(n) = S(n) - S(n-2) = \frac{S1(k) + S2(l-1)}{2} - \frac{S1(k-1) + S2(l-2)}{2} \quad (2.6)$$

When the successive form of the processed sensor value S is used, formula (2.6) can be rewritten as formula (2.7).

$$dS(x) = \frac{S(x) + S(x-1)}{2} - \frac{S(x-2) + S(x-3)}{2} \quad (2.7)$$

As described above, in the second embodiment, an average of the successively received reception value S1 and reception value S2 is calculated first, and then, the difference between the average values is calculated as the difference value dS. Specifically, the difference calculator 73 properly selects the processed sensor value S to calculate the difference value dS so that the fluctuation caused by the variation in slopes of the multiple sensing elements 51, 61 can be restricted. With this configuration, the fluctuation in the result of difference calculation is restricted. Thus, the differential calculator 75 can use the difference value dS whose fluctuation is restricted to correctly calculate the differential value Sd. Thus, the communication system according to the second embodiment can provide advantages similar to the communication system according to the first embodiment.

In the above-described example, the average value is calculated using two successive sensor values. Alternatively, four successive sensor values can be used to calculate the average value, or moving average calculation method can be used to obtain the average values. In this case, the filter 74 can perform the filtering process with any cutoff frequency f_co.

Third Embodiment

Figure 8:
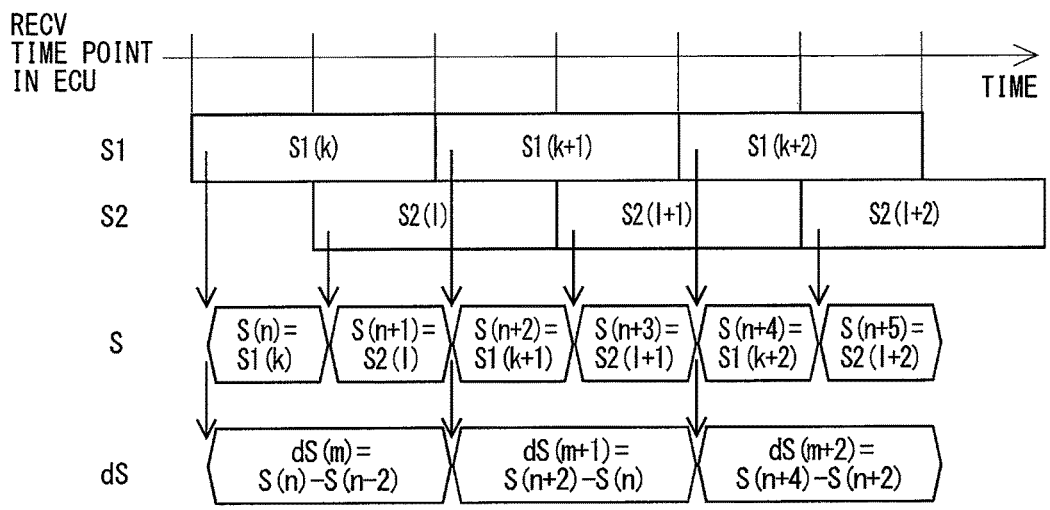
FIG. 8 is a time chart showing processed sensor values and difference value calculation according to the third embodiment of the present disclosure.

The following will describe a calculation of the processed sensor value S and the sensor value difference dS according to the third embodiment of the present disclosure with reference to FIG. 8. In the third embodiment, the calculation of the processed sensor value S is similar to the first embodiment. Compared with the first embodiment, in the calculation of the sensor value difference dS according to the third embodiment, only the sensor reception value from a specified sensing element is used.

In an example shown in FIG. 8, the sensor value difference dS is calculated using the following formula (3.1) based on the processed sensor values $S(n)=S1(k)$, $S(n+2)=S1(k+1)$, $S(n+4)=S1(k+2)$ and so on. In this example, only the reception values S1 from the first sensing element 51 are used in the difference calculation.

$$dS(m) = S(n) - S(n-2) \quad (3.1)$$

The processed sensor values S(n+1), S(n+3), S(n+5) ... assigned with the reception values S2 from the second sensing element 61 are not used in the calculation.

In the above example, the calculation cycle of the sensor value difference dS is twice as much as the calculation cycle of the processed sensor value S.

Suppose that the number of the multiple sensing elements is equal to R. Among the multiple sensing elements, when the sensor reception value from only one sensing element is used to calculate the sensor value difference dS, the calculation cycle of the sensor value difference dS is R times as much as the calculation cycle of the processed sensor value S. In this case, a formula for calculating the sensor value difference is represented as the following formula (3.2).

$$dS(m) = S(n) - S(n-R) \quad (3.2)$$

Fourth Embodiment

The following will describe a communication system according to the fourth embodiment of the present disclosure with reference to FIG. 9. The fourth embodiment suppose a case where one of the multiple sensing elements described in the first embodiment has an abnormality and the sensor value of this abnormal sensing element cannot be used in the calculation of the sensor value difference dS.

In an example shown in FIG. 9, suppose that the second sensing element 61 has a malfunction and the reception values S2 from the second sensing element 61 cannot be used in the calculation. In this case, the processed sensor values S(n+3), S(n+5) cannot be acquired. Thus, sensor value difference dS(n+3), dS(n+5) cannot be calculated.

Under this situation, the microcomputer 711 switches to a calculation mode in which only the reception values S1 transmitted from the normally operating first sensing element 51 are used in the calculation.

In the calculation example I shown in FIG. 9 after the calculation mode switch, the sensor value difference dS(n+1) calculated using the reception values S2 acquired before the malfunction of the second sensing element is set equal to the last time value as shown in the following formula (4.1).

$$dS(n+1)=dS(n) \quad (4.1)$$

In the calculation example II shown in FIG. 9 after the calculation mode switch, the sensor value difference dS is calculated by a cycle twice as much as the calculation cycle of the processed sensor value S only using the processed sensor values S1 transmitted from the normally operating first sensing element 51 using the following formula (4.2) as described in the third embodiment.

$$dS(m)=S(n)-S(n-2) \quad (4.2)$$

Wherein n is an even number. In the calculation example II, the sampling cycle of the differential calculator 75 is doubled. Thus, a time difference (conversion coefficient) used in the differential calculation needs to be switched corresponding to the sampling cycle. Further, parameters of the filter 74 including the cutoff frequency f_co may be preferably switched.

As described above, when a malfunction occurs to one of the multiple sensing elements 51, 61, the microcomputer 711 switches a calculation mode to calculate the sensor value difference dS using only the sensor values transmitted from the normally operating sensing element. With this configuration, the control performed based on the detected steering torque, which is the physical quantity of the detection target, can be continued without interruption. That is, the control for outputting the assist torque from the motor 80 can be continued without interruption.

The microcomputer 711 includes the filter 74. In a case where a part of the sensing elements have abnormalities and the calculation needs to be switched to use sensor values from normally operating sensing elements, the parameter can be properly switched in the filter 74. Thus, the control operation can be smoothly switched.

Fifth Embodiment

Figure 10A:
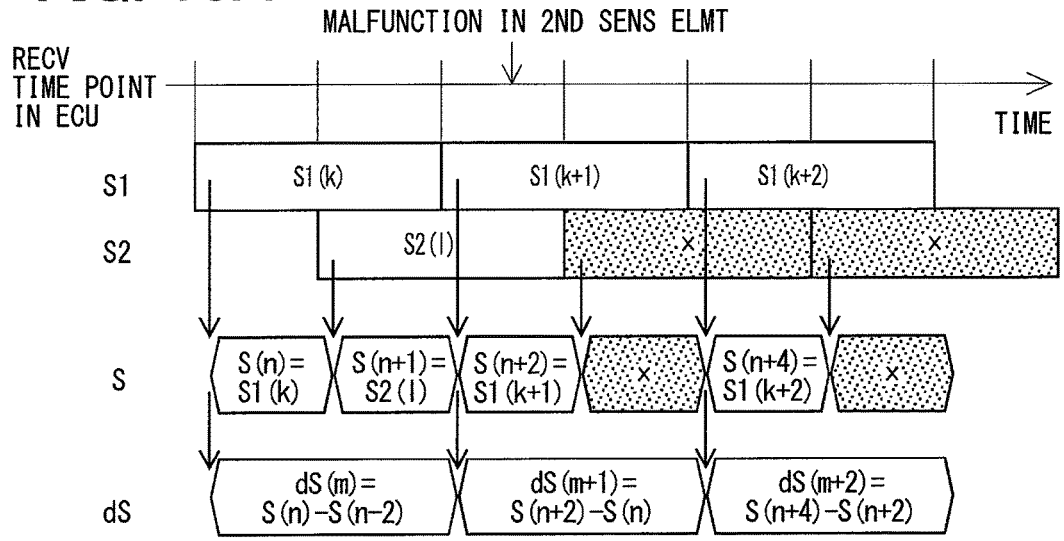
FIG. 10A is a time chart showing processed sensor values and difference value calculation when a malfunction occurs to one of the sensing elements according to the fifth embodiment of the present disclosure.
Figure 10B:
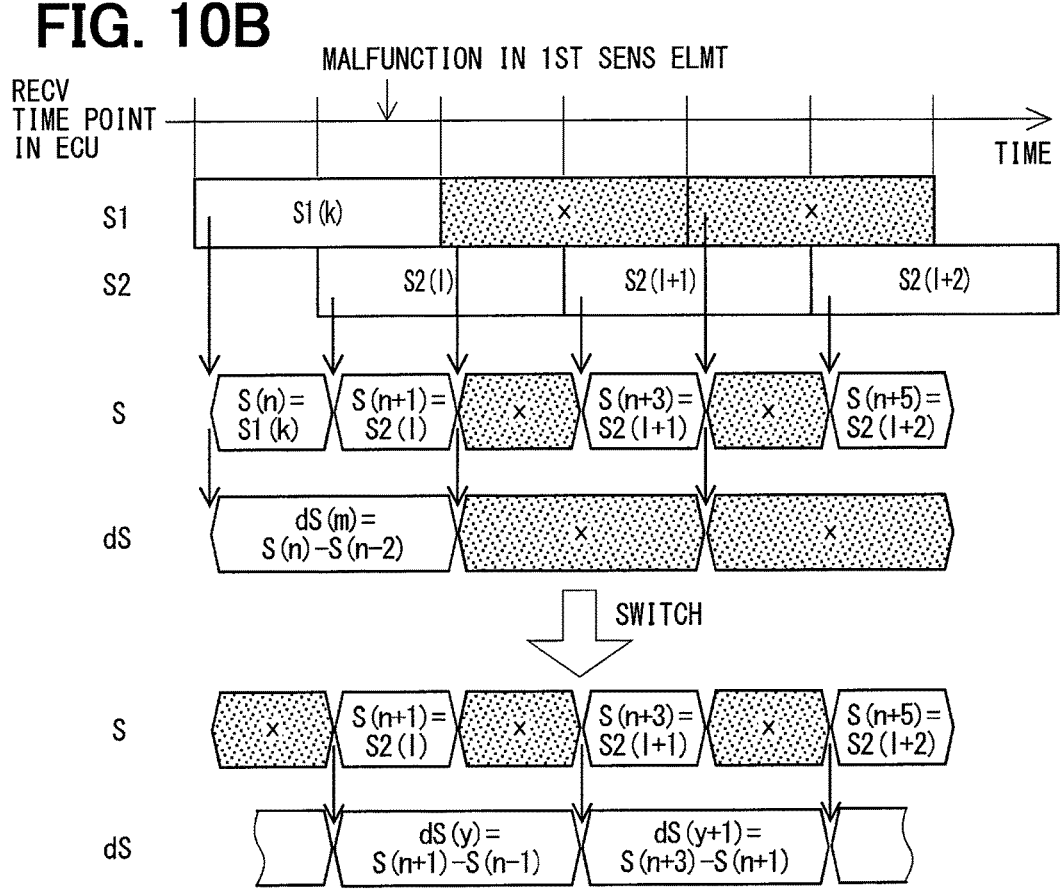
FIG. 10B is a time chart showing processed sensor values and difference value calculation when a malfunction occurs to another one of the sensing elements according to the fifth embodiment of the present disclosure.

The following will describe a communication system according to the fifth embodiment of the present disclosure with reference to FIG. 10A and FIG. 10B. The fourth embodiment supposes a case where a malfunction occurs to one of the multiple sensing elements and the sensor value of the sensing element having the malfunction cannot be used while a specified sensor reception value described in the third embodiment is used in the calculation of the difference value.

In an example shown in FIG. 10A, suppose that a malfunction occurs to the second sensing element 61 while only the reception values S1 from the first sensing element 51 are used in the difference calculation. In this case, the calculation process has no need to be switched since the reception values S2 from the second sensing element 61 are not used in the difference calculation.

In an example shown in FIG. 10B, suppose that a malfunction occurs to the first sensing element 51 and the reception values S1 cannot be used while only the reception values S1 from the first sensing element 51 are used in the difference calculation. In this case, the processed sensor values S(n+2), S(n+4) . . . cannot be obtained. Thus, the sensor value difference dS(m+1), dS(m+2) . . . cannot be calculated.

In this case, the microcomputer 711 switches a calculation mode from a mode in which only the reception values S1 are used to another mode in which only the reception values S2 are used. After the calculation mode switch, the sensor value difference dS can be calculated using the following formula (5).

$$dS(y)=S(n+1)-S(n-1) \quad (5)$$

Sixth Embodiment

Figure 11:
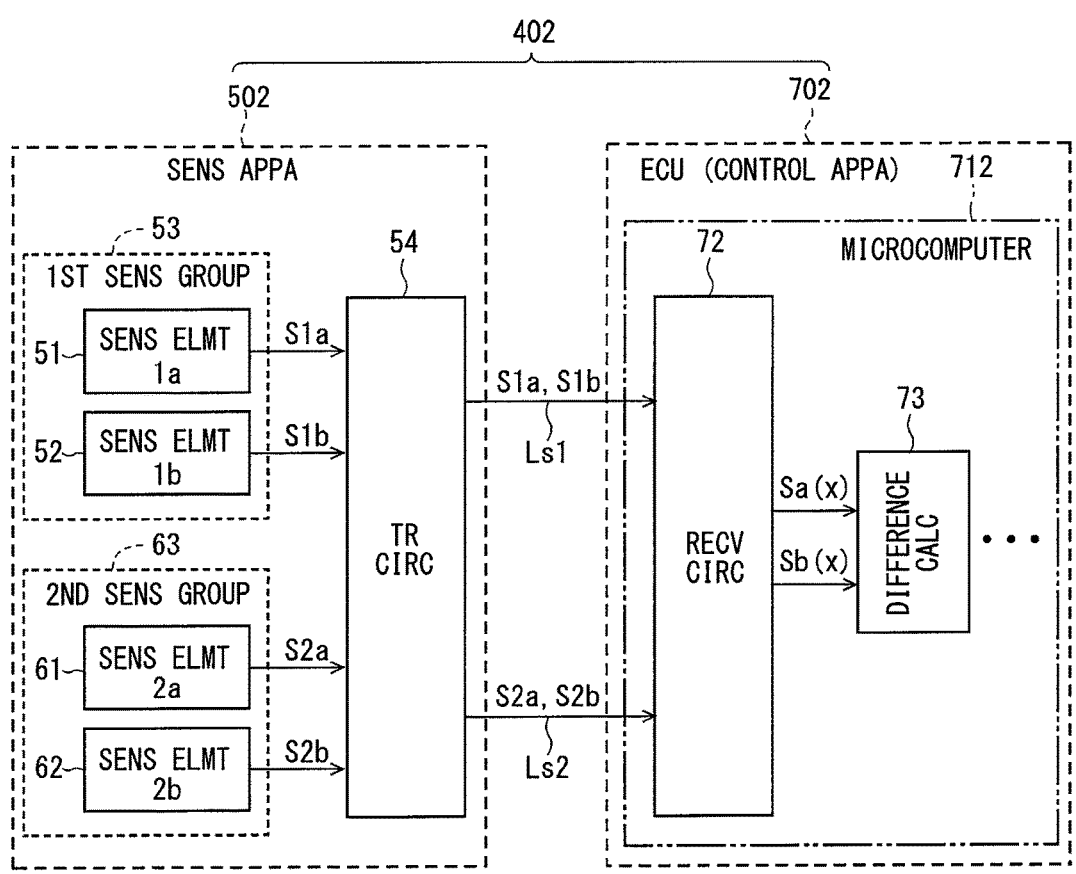
FIG. 11 is a block diagram showing a configuration of a communication system according to a sixth embodiment of the present disclosure.
Figure 12:
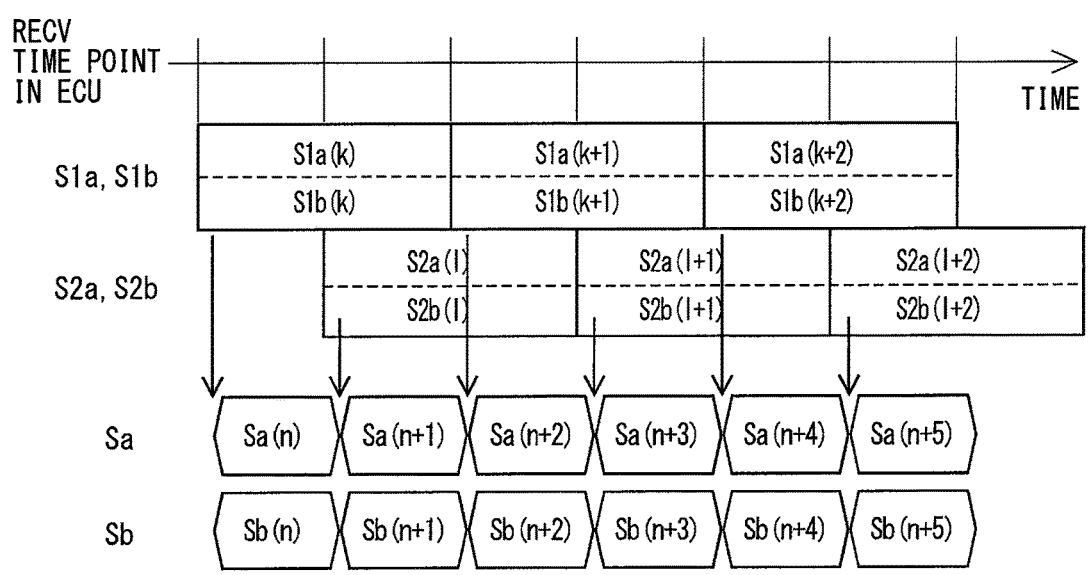
FIG. 12 is a time chart showing processed sensor values and difference value calculation according to the sixth embodiment of the present disclosure.

The following will describe a communication system, a calculation of the processed sensor value S and sensor value difference dS according to the sixth embodiment of the present disclosure with reference to FIG. 11 and FIG. 12.

As shown in FIG. 11, the communication system 402 includes a sensor apparatus 502 and an ECU 702. The ECU 702 includes a microcomputer 712. The sensor apparatus 502 has multiple sensing elements 51, 52, 61, 62. The multiple sensing elements have substantially same specification and configuration, and detect the same physical quantity from the same detection target. The multiple sensing elements are divided into multiple sensing element groups. Each sensing element group transmits the sensor signals to the microcomputer 712 using a common signal line.

The sensing elements 51 and 52 are divided into a first sensing element group (1ST SENS GROUP) 53, and the sensing elements 61 and 62 are divided into a second sensing element group (2ND SENS GROUP) 63. Thus, in the example shown in FIG. 11, the sensor apparatus 502 includes two sensing element groups, specifically, the first sensing element group 53 and the second sensing element group 63. In the drawings, the sensing elements 51, 52 included in the first sensing element group 53 are represented as sensing element 1a and sensing element 1b for distinguishing from one another, and the sensing elements 61, 62 included in the second sensing element group 63 are represented as sensing element 2a and sensing element 2b for distinguishing from one another. The sensor values detected by the sensing elements 1a, 1b, 2a, 2b are represented as S1a, S1b, S2a, S2b, respectively.

The sensor signal including the sensor values S1a and S1b is transmitted to the microcomputer 712 through the signal line Ls1, and the sensor signal including the sensor values S2a and S2b is transmitted to the microcomputer 712 through the signal line Ls2. The sensor values S1a and S1b may be transmitted as the main data and sub data included in the SENT signal shown in FIG. 3. Similarly, the sensor values S2a and S2b may be transmitted as the main data and sub data included in the SENT signal shown in FIG. 3.

In an actual product, the sensor apparatus 502 may be manufactured as a single package. Alternatively, a package including the first sensing element group 53 may be separately disposed from a package including the second sensing element group 63 and the two sensing element groups 53 and 63 may be electrically connected by a conductive connection. Herein, signal lines Ls1 and Ls2 are described as different signal lines in order to clarify two signal lines Ls1 and Ls2 corresponding to respective sensing element groups 53, 63. In actual use, the two signal lines Ls1 and Ls2 may be achieved by one physical signal wire without being divided into two separate wires.

A configuration of the microcomputer 712 is similar to the configuration shown in FIG. 1A and FIG. 1B regarding the filter 74, the differential calculator 75, and the assist amount calculator 76. Thus, detailed configuration of the microcomputer 712 is omitted in the drawing.

As shown in FIG. 12, the transmission circuit 54 of the sensor apparatus 502 transmits the sensor signal including sensor values S2a and S2b obtained from the second sensing element group 63 at a time shifted (delayed) by half of the transmission cycle from a transmission time of the sensor signal including sensor values S1a and S1b obtained from the first sensing element group 53. The reception circuit 72 of the microcomputer 712 receives the sensor values S1a and S1b at a time different from a reception time of the sensor values S2a and S2b. The reception circuit 72 calculates the processed sensor value Sa based on the sensor values S1a, S2a, and calculates the processed sensor value Sb based on the sensor values S1b, S2b.

In the above communication system 402, when the sensing element 1a and the sensing element 1b included in the first sensing element group 53 are supplied with power by the same power source, the power source offset may adversely affect both the sensing elements 1a and 1b and both the sensor values S1a and S1b. Thus, the processed sensor values Sa(n), Sb(n) . . . obtained at even number counts based on the sensor values S1a(k) . . . and S1b(k) . . . have the same power source offset component.

In the difference calculation, by calculating a difference value dS between the processed sensor values obtained at even number counts as shown in the following formula (6.1) and formula (6.2), the power source offset error can be restricted.

$$dSa(n)=Sa(n)-Sa(n-2) \quad (6.1)$$

$$dSb(n)=Sb(n)-Sb(n-2) \quad (6.2)$$

As another example, a difference between adjacent average values of the processed sensor values Sa and Sb may be calculated as shown in the following formula (6.3).

$$dS(n) = \frac{Sa(n)+Sb(n)}{2} - \frac{Sa(n-2)+Sb(n-2)}{2} \quad (6.3)$$

Figure 13:
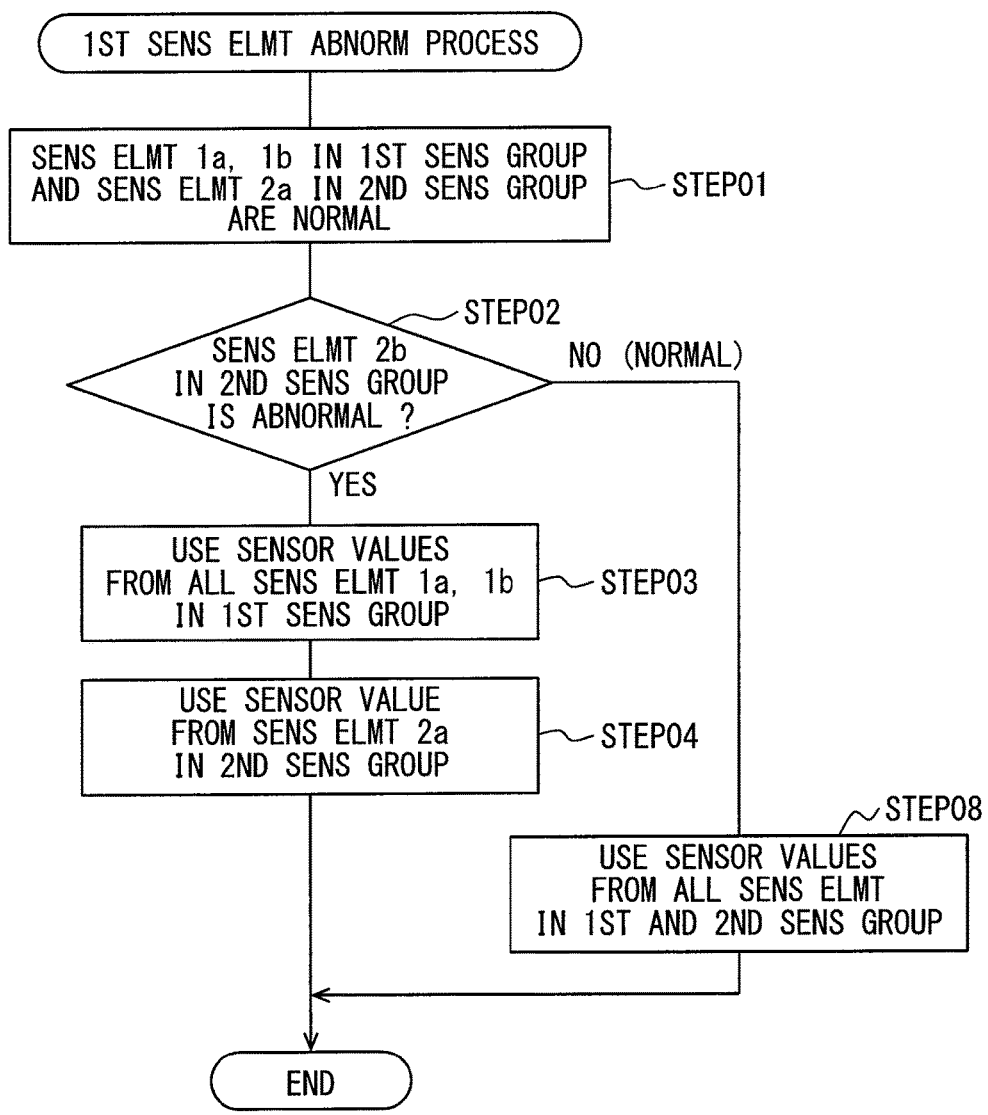
FIG. 13 is a flowchart showing a first process executed when a sensor value outputted from one of sensing elements included in one of sensing element groups is determined to be abnormal.
Figure 14:
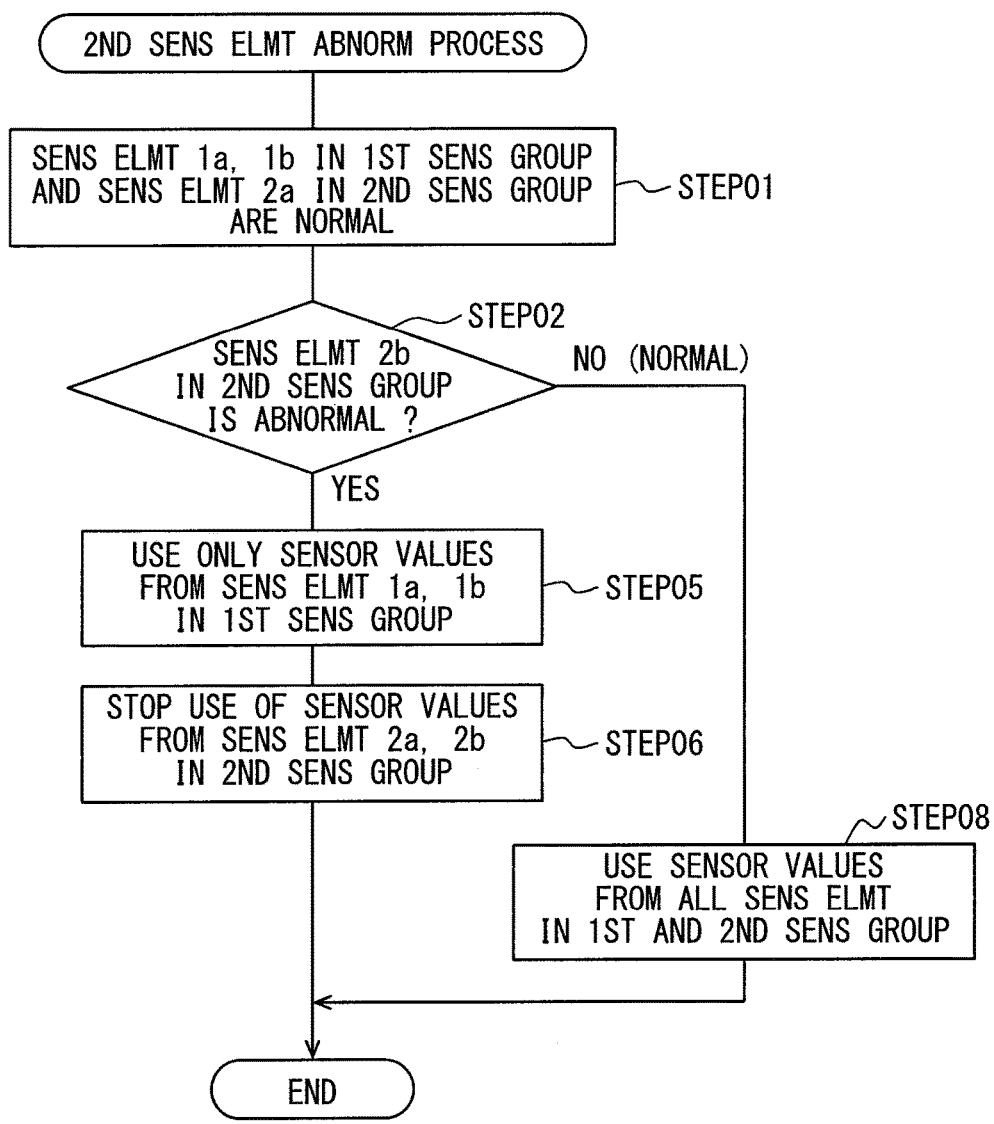
FIG. 14 is a flowchart showing a second process executed when a sensor value outputted from one of sensing elements included in one of sensing element groups is determined to be abnormal.
Figure 15:
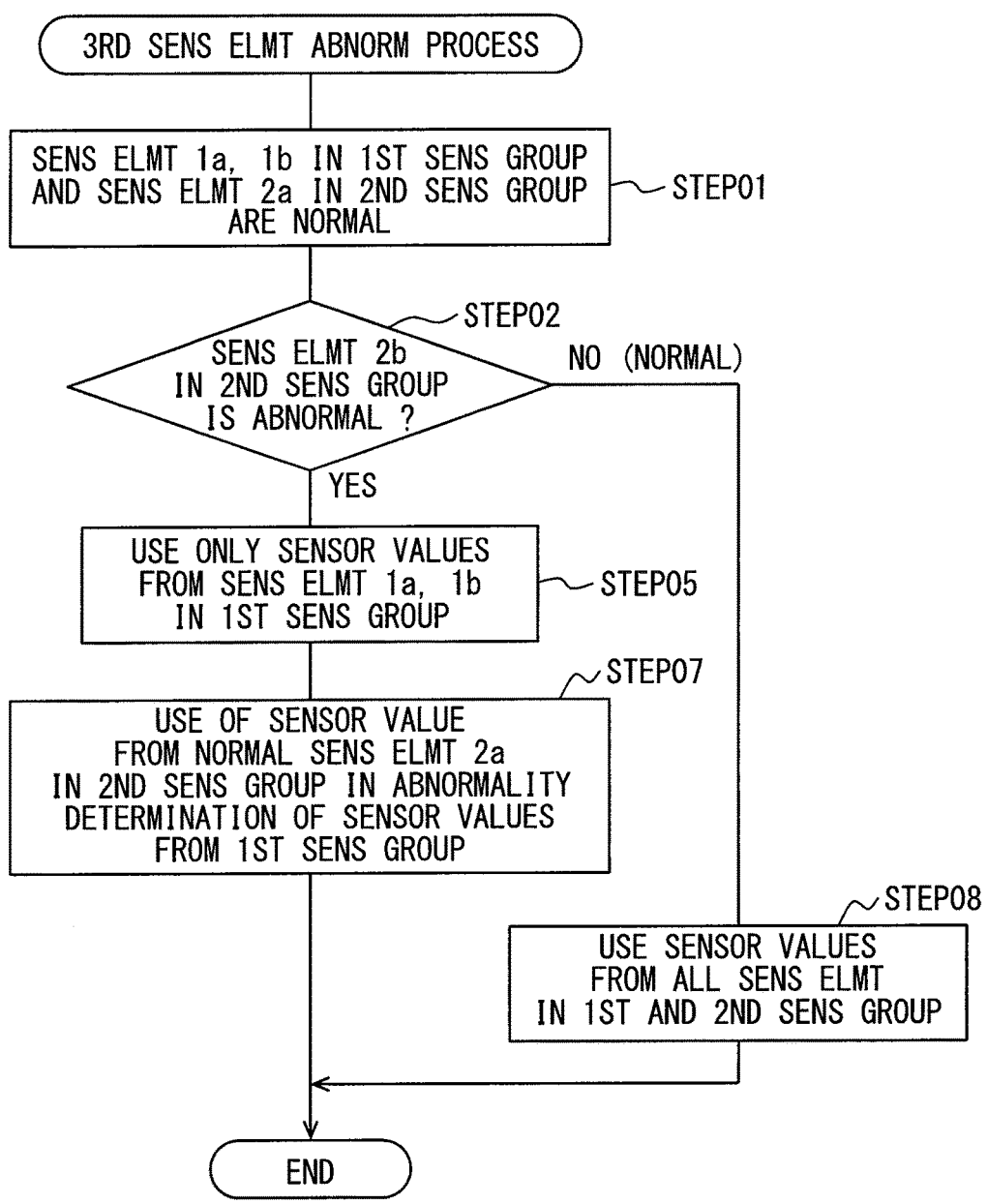
FIG. 15 is a flowchart showing a third process executed when a sensor value outputted from one of sensing elements included in one of sensing element groups is determined to be abnormal.

In the communication system according to the sixth embodiment, when one of the sensing elements included in one of the sensing element groups has a malfunction and the sensor value detected by the sensing element having the malfunction becomes abnormal, the microcomputer executes sensing element abnormality process (SENS ELMT ABNORM PROCESS). The sensing element abnormality process have three patterns as shown in the flowcharts of FIG. 13 to FIG. 15, and the three patterns are referred to as first sensing element abnormality process, second sensing element abnormality process, and third sensing element abnormality process in the following description.

In the flowchart and the following description, first sensing element group is simplified as first group, and the second sensing element group is simplified as second group. In the following description, the symbol of each sensing element and sensing element group will be omitted for simplification.

An abnormality or malfunction occurred in the sensor value is determined when the sensor value has apparently abnormal value is confirmed or is determined by majority decision. The determination of the abnormality occurrence can be determined using other well-known methods. Details of the determination method will be omitted.

In order to simplify the description, assume that the sensing elements 1a and 1b of the first group and the sensing element 2a of the second group are in the normally operating states. This assumption is defined as a common STEP01.

The first sensing element abnormality process shown in FIG. 13, second sensing element abnormality process shown in FIG. 14, and third sensing element abnormality process shown in FIG. 15 also have a common STEP02. At STEP02, the sensor apparatus determines whether the sensing element 2b of the second group is abnormal or not. When the sensing element 2b is determined to be normal (STEP02: NO), the process proceeds to common STEP 08, and the microcomputer uses the sensor values transmitted from all of the sensing elements included in both the first group and the second group.

When the sensing element 2b is determined to be abnormal (STEP02: YES), the process branches into three different patterns. In the following description, the sensing element group which includes the abnormal sensing element 2b is also referred to as a treatment-required sensing element group. That is, the microcomputer 712 defines the second group as the treatment-required sensing element group. The first group is also referred to as a remaining sensing element group other than the treatment-required sensing element group.

In the first sensing element abnormality process shown in FIG. 13, when the sensing element 2b is determined to be abnormal, the sensor values from all of the sensing elements 1a, 1b included in the first group are used in the calculation (STEP03). For the second group, the sensor value from the normally operating sensing element 2a is used in the calculation as sensor value from the second group (STEP04).

With this configuration, the abnormal value from the sensing element 2b determined to have the malfunction is not used in the calculation and all of the available normal sensor values are properly used in the difference calculation and the differential calculation.

In the second sensing element abnormality process shown in FIG. 14, when the sensing element 2b is determined to be abnormal, only the sensor values from all of the sensing elements 1a, 1b included in the first group are used in the calculation (STEP05). The sensor values from all of the sensing elements 2a, 2b included in the second group are not used in the calculation (STEP06).

With this configuration, the abnormal value from the sensing element 2b determined to have the malfunction is not used in the calculation. Further, by simply switching the calculation mode corresponding to the first group, the difference calculation and the differential calculation can be properly carried out.

In the third sensing element abnormality process shown in FIG. 15, when the sensing element 2b is determined to be abnormal, only the sensor values from all of the sensing elements 1a, 1b included in the first group are used in the calculation (STEP05). Then, the normal sensor value from the normally operating sensing element 2a of the second group is used to determine an abnormality occurrence in the sensor signal transmitted from the first group (STEP07).

With this configuration, advantages similar to the second sensing element abnormality process can be obtained. Further, the normal sensor value which is not used in the difference calculation can be effectively used in the determination of abnormality occurrence.

As described above, the sensor apparatus 502 in the sixth embodiment includes multiple sensing element groups each of which includes multiple sensing elements. This redundant configuration is for securing the detection operation of the sensor apparatus 502. In this configuration, when one of the sensing elements has a malfunction, various kinds of process can be carried out regarding the malfunction occurrence. The first to third sensing element abnormality process described above may be combined with each other according to the actual situation and needs, or may be used separately according to the actual situation and needs. With the above communication system according to the sixth embodiment, the calculation of the assist amount can be carried out with a higher reliability.

Other Embodiments

In the above-described first to fifth embodiments, the sensor apparatus has two sensing elements. Alternatively, the sensor apparatus may have three or more sensing elements, and the sensor signals from the respective sensing elements can be transmitted at respective transmission time points. In this case, the respective transmission time points can be shifted from adjacent transmission time point by a predetermined period within one transmission cycle.

In the above-described sixth embodiment, the sensor apparatus has two sensing element groups. Alternatively, the sensor apparatus may have three or more sensing element groups. In this case, the respective transmission time points of the sensor signal corresponding to each sensing element group can be shifted from one another by a predetermined period within one transmission cycle.

In the above-described configurations, the reception circuit may receive the sensor signal corresponding to each sensing element or each sensing element group at different time points each of which is shifted by a predetermined period from another one.

When the number of the sensor signals which are transmitted during one transmission cycle is equal to three, the transmission time points of the three sensor signals are shifted by one third of the transmission cycle from immediately prior transmission time point. When the number of the sensor signals which are transmitted during one transmission cycle is equal to four, the transmission time points of the four sensor signals are shifted by a quarter of the transmission cycle from immediately prior transmission time point. With this configuration, multiple sensor signals can be transmitted within one transmission cycle. Thus, sampling interval and the differential time in the differential calculation can be maintained at constant values, and the calculation can be simplified.

In the above-describe first to fifth embodiments, the sensor signal S1 from the first sensing element 51 and the sensor signal S2 from the second sensing element 61 are transmitted at different time points, and one of the transmission time points is shifted by half of the transmission cycle from the other one transmission time point. That is, the sensor signal S1 and the sensor signal S2 are transmitted at time points corresponding to half of the transmission cycle. Further, as described above, when the number of the sensor signals to be transmitted at different time points is equal to three or more, the transmission interval between adjacent two transmission time points is preferably set to be constant corresponding to the number of the sensor signals.

As another example, the transmission interval can be set different from one another under a condition that a control is carried out to switch the sampling interval or the difference time used in the differential calculation in each calculation.

In the above-described first to fifth embodiments, FIG. 5, FIG. 7 to FIG. 10B show a calculation of the processed sensor value and the difference calculation. The sensor reception value is directly stored as the processed sensor value S(n). Instead of the direct storing of the sensor reception value as the processed sensor value, correction of reception value or calculation for converting the reception value to another physical quantity can be carried out before storing the sensor reception value as the processed sensor value.

In this case, the receptions value S1 and the reception value S2 are calculated in similar manner as the processed sensor value. As another example, the reception value S1 may be converted to another physical quantity S1#, the reception value S2 may be converted to another physical quantity S2#, and a difference between the converted physical quantity S1# and the converted physical quantity S2# can be calculated as sensor value difference dS.

In the foregoing embodiments, the digital communication protocol of the communication system adopts SENT protocol. Alternatively, other communication protocols may be used in the communication system. For example, as the sensor signal, eight bit octet signal may be used instead of the four bit nibble signal.

In the foregoing embodiments, the sensing element adopts the hall element. Alternatively, other elements that can detect the magnetic field may be used as the sensing element. Further, an element detecting a varying physical quantity other than the magnetic field can be used as the sensing element. The physical quantity detected by the sensing element is not limited to the torque. The sensing element may detect physical quantities, such as a rotational angle, a stroke, a load, a pressure or the like.

The communication system according to the foregoing embodiments is applied to the electric power steering apparatus. Alternatively, the communication system according to the present disclosure may be applied to a different apparatus that requires the microcomputer to perform a control calculation or control operation based on the detected sensor signal value.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A communication system applied to an electric steering apparatus of a vehicle, the electric steering apparatus including a motor for providing torque that controls a steering of the vehicle, the torque being based on a steering torque applied by a driver of the vehicle, the system comprising:

a sensor apparatus including a plurality of sensing elements and a transmission circuit, wherein each of the plurality of sensing elements detects a sensor value indicating the steering torque applied by the driver to the steering of the vehicle, the transmission circuit transmits, at a transmission cycle, a plurality of sensor signals each of which including information indicating the sensor value detected by each of the plurality of sensing elements, and the plurality of sensor signals are transmitted as digital signals and the transmission cycle is a constant cycle; and a microcomputer including a reception circuit, a difference calculator, and a differential calculator, wherein the reception circuit receives the plurality of sensor signals and acquires the sensor values, the difference calculator calculates a difference value, the difference value is a value indicating a difference among the sensor values or among processed sensor values, the processed sensor values are calculated based on the sensor values, and the differential calculator calculates a differential value by dividing the difference value by a time difference, the transmission circuit shifts a transmission time point of one of the plurality of sensor signals including the sensor value detected by one of the plurality of sensing elements by a predetermined period with respect to a transmission time point of another one of the plurality of sensor signals including the sensor value detected by another one of the plurality of sensing elements, the predetermined period is set shorter than the transmission cycle of the transmission circuit, the reception circuit updates the sensor value detected by one of the plurality of sensor elements and transmitted from the transmission circuit at a last time point to the sensor value detected by the one of the plurality of sensor elements and transmitted from the transmission circuit at a present time point, and the reception circuit updates the sensor value detected by another one of the plurality of sensor elements at a time point different from the sensor signal detected by the one of the plurality of sensor elements, the difference calculator calculates the difference value so that an offset error among the plurality of sensing elements of the sensor apparatus is compensated or a fluctuation caused by a variation in slopes of output characteristics of the plurality of sensing elements is reduced, and the microcomputer calculates a control amount of the motor for outputting the torque that controls the steering of the vehicle, the control amount being calculated based on the differential value calculated by the differential calculator, wherein the motor outputs the torque that controls the steering of the vehicle according to the control amount.

2. The communication system according to claim 1, wherein
the transmission circuit sets the transmission time points of the plurality of sensor signals corresponding to a period obtained by dividing the transmission cycle by a total number of the plurality of sensor signals transmitted within the transmission cycle.

3. The communication system according to claim 1, wherein
the difference calculator calculates, regarding at least one of the plurality of sensing elements, the difference value based on the sensor values detected by the at least one of the plurality of sensing elements at different time points.

4. The communication system according to claim 3, wherein
the difference calculator calculates, regarding each of the plurality of sensing elements, the difference value based on the sensor values detected by each of the plurality of sensing elements at different time points.

5. The communication system according to claim 1, wherein
the difference calculator calculates, as the difference value, a difference between two average sensor values, one of the two average sensor values is an average of the sensor value detected at the second-to-last time point and the sensor value detected at the last time point, and a remaining one of the two average sensor values is an average of the sensor value detected at the last time point and the sensor value detected at the present time point.

6. The communication system according to claim 1, wherein
the microcomputer further includes a filter which performs a filtering process to the difference value or to the differential value.

7. The communication system according to claim 1, wherein,
when at least one of the plurality of sensing elements has an abnormality, the microcomputer controls the difference calculator to switch a calculation mode of the difference value using the sensor values from remaining of the plurality of sensing elements which are in normally operating states.

8. The communication system according to claim 7, wherein,
when the calculation mode of the difference value by the difference calculator or a calculation mode of the processed sensor values used in a calculation of the difference value is switched in response to the abnormality occurred in the at least one of the plurality of sensing elements, the microcomputer switches a calculation parameter corresponding to the sensor values used in the calculation of the difference value.

9. The communication system according to claim 8, wherein
the microcomputer further includes a filter which performs a filtering process to the difference value or to the differential value, and
the calculation parameter includes a cutoff frequency of the filter.

10. The communication system according to claim 1, wherein
the sensor apparatus includes a plurality of sensing element groups each of which including a plurality of sensing elements,
the sensor apparatus transmits a sensor signal corresponding to each of the plurality sensing element groups using a common signal line which is shared by the plurality of sensing elements included in each of the plurality of sensing element groups, and
the transmission circuit shifts a transmission time point of the sensor signal including sensor values detected by the plurality of sensing elements included in one of the plurality of sensing element groups by a predetermined period from a transmission time point of the sensor signal including sensor values detected by the plurality of sensing elements included in another one of the plurality of sensing element groups.

11. The communication system according to claim 10, wherein,
when the microcomputer determines that the sensor value of at least one of the plurality of sensing elements included in at least one of the plurality of sensing element groups has an abnormality,
the microcomputer defines the at least one of the plurality of sensing element groups including the at least one of the plurality of sensing elements determined to have the abnormality as a treatment-required sensing element group, the microcomputer uses, in a calculation of the difference value, the sensor values from all of the plurality of sensing elements included in remaining of the plurality of sensing element groups other than the treatment-required sensing element group, and the microcomputer uses, in the calculation of the difference value, the sensor values from remaining of the plurality of sensing elements other than the at least one of the plurality of sensing elements determined to have the abnormality in the treatment-required sensing element group as the sensor value of the treatment-required sensing element group.

12. The communication system according to claim 10, wherein, when the microcomputer determines that the sensor value of at least one of the plurality of sensing elements included in at least one of the plurality of sensing element groups has an abnormality, the microcomputer defines the at least one of the plurality of sensing element groups including the at least one of the plurality of sensing elements determined to have the abnormality as a treatment-required sensing element group, the microcomputer uses, in a calculation of the difference value, the sensor values from all of the plurality of sensing elements included in remaining of the plurality of sensing element groups other than the treatment-required sensing element group, and the microcomputer does not use, in the calculation of the difference value, the sensor values from all of the plurality of sensing elements included in the treatment-required sensing element group.

13. The communication system according to claim 10, wherein, when the microcomputer determines that the sensor value of at least one of the plurality of sensing elements included in at least one of the plurality of sensing element groups has an abnormality, the microcomputer defines the at least one of the plurality of sensing element groups including the at least one of the plurality of sensing elements determined to have the abnormality as a treatment-required sensing element group, the microcomputer uses, in a calculation of the difference value, the sensor values from all of the plurality of sensing elements included in remaining of the plurality of sensing element groups other than the treatment-required sensing element group, and the microcomputer uses, in an abnormality determination of the sensor values from all of the plurality of sensing elements included in remaining of the plurality of sensing element groups other than the treatment-required sensing element group, the sensor values from remaining of the plurality of sensing elements other than the at least one of the plurality of sensing elements determined to have the abnormality in the treatment-required sensing element group.

14. The communication system according to claim 1, wherein the sensor signal adopts a nibble signal defined under SAE-J2716 which is a standard established by Society of Automotive Engineers International.

* * * * *